United States Patent
Du et al.

(10) Patent No.: US 12,146,667 B1
(45) Date of Patent: Nov. 19, 2024

(54) LIGHTNING PROTECTIVE AND ELECTRIC HEATING PORCELAIN TILE AND PREPARATION METHOD THEREOF

(71) Applicants: Jun Du, Seattle, WA (US); Bo Lu, Seattle, WA (US)

(72) Inventors: Jun Du, Seattle, WA (US); Bo Lu, Seattle, WA (US); Shuhua Liu, Foshan (CN)

(73) Assignees: Jun Du, Seattle, WA (US); Bo Lu, Seattle, WA (US)

( * ) Notice: Subject to any disclaimer, the term of this patent is extended or adjusted under 35 U.S.C. 154(b) by 0 days.

(21) Appl. No.: 18/743,073

(22) Filed: Jun. 13, 2024

Related U.S. Application Data

(63) Continuation of application No. PCT/CN2024/090849, filed on Apr. 30, 2024.

(51) Int. Cl.
| | | |
|---|---|---|
| *F24D 19/10* | (2006.01) | |
| *F24D 13/02* | (2006.01) | |
| *H02G 13/00* | (2006.01) | |
| *H05B 3/22* | (2006.01) | |

(52) U.S. Cl.
CPC ....... *F24D 19/1096* (2013.01); *F24D 13/024* (2013.01); *H02G 13/40* (2013.01); *H02G 13/80* (2013.01); *H05B 3/22* (2013.01); *H05B 2203/026* (2013.01)

(58) Field of Classification Search
None
See application file for complete search history.

(56) References Cited

U.S. PATENT DOCUMENTS

| | | | | |
|---|---|---|---|---|
| 1,350,329 | A * | 8/1920 | Parker | H01T 1/16 337/33 |
| 1,509,495 | A * | 9/1924 | Slepian | H01C 7/12 338/21 |
| 1,509,496 | A * | 9/1924 | Slepian | H01C 7/12 361/126 |
| 1,872,510 | A * | 8/1932 | Schweitzer | H01T 1/08 361/121 |
| 2,989,608 | A * | 6/1961 | Hicks | H01T 1/14 337/279 |
| 4,015,105 | A * | 3/1977 | Dunn | H05B 3/14 219/548 |

(Continued)

*Primary Examiner* — Thor S Campbell
(74) *Attorney, Agent, or Firm* — Hemisphere Law, PLLC; Zhigang Ma

(57) ABSTRACT

A lightning protective and heating porcelain tile includes a porcelain tile layer, a shell, a metal plate protective layer, and an electric heating film heating layer. The metal plate protective layer is attached to the inner wall of the porcelain tile layer, and the electric heating film heating layer is attached to the metal plate protective layer. The electric heating film heating layer includes an electric heating film, a first lightning protective module and a second lightning protective module. The hot wire and neutral wire connected to the electric heating film are electrically connected to the first lightning protective module and the second lightning protective module, respectively. The first lightning protective module and the second lightning protective module are electrically connected to the metal plate protective layer individually. The first lightning protective module and the second lightning protective module are made of varistors.

9 Claims, 2 Drawing Sheets

(56) References Cited

U.S. PATENT DOCUMENTS

| | | | | |
|---|---|---|---|---|
| 4,115,917 | A * | 9/1978 | Charon | H05B 3/36 29/621 |
| 4,141,187 | A * | 2/1979 | Graves | E04D 7/00 52/309.3 |
| 4,839,500 | A * | 6/1989 | Cremer | F24D 13/022 361/216 |
| 5,922,231 | A * | 7/1999 | Karst | H05B 3/14 219/505 |
| 6,621,983 | B2 * | 9/2003 | Thorin | F24D 3/141 219/505 |
| 7,187,854 | B2 * | 3/2007 | Sauvageau | F24D 11/00 392/435 |
| 8,183,504 | B2 * | 5/2012 | Montoya | H01C 7/18 219/505 |
| 10,113,273 | B2 * | 10/2018 | Consiglio | E01C 11/265 |
| 2004/0175164 | A1 * | 9/2004 | Loktev | H05B 3/283 392/436 |
| 2010/0089899 | A1 * | 4/2010 | Dohring | F24D 13/024 219/548 |
| 2011/0253694 | A1 * | 10/2011 | Consiglio | F24D 13/024 219/213 |
| 2011/0272392 | A1 * | 11/2011 | Dohring | H05B 3/20 29/592.1 |
| 2011/0284647 | A1 * | 11/2011 | Montanari | F24D 13/024 237/69 |
| 2013/0034343 | A1 * | 2/2013 | Gilad | H05B 3/34 219/520 |
| 2013/0119043 | A1 * | 5/2013 | Consiglio | E01C 5/00 439/502 |
| 2015/0245729 | A1 * | 9/2015 | Morin | H05B 1/0261 219/533 |
| 2015/0382403 | A1 * | 12/2015 | Philip | H05B 3/12 219/541 |
| 2023/0098283 | A1 * | 3/2023 | Lebeau | H02J 3/007 307/43 |
| 2024/0240411 | A1 * | 7/2024 | Szekely | E01C 11/265 |

* cited by examiner

LIGHTNING PROTECTIVE AND ELECTRIC HEATING PORCELAIN TILE AND PREPARATION METHOD THEREOF

CROSS-REFERENCE TO RELATED APPLICATION

This application is a continuation of International Patent Application No. PCT/CN2024/090849, filed Apr. 30, 2024, which is herein incorporated by reference in its entirety.

TECHNICAL FIELD

The disclosure relates to the field of heating porcelain tile technologies, and particularly to a lightning protective and heating porcelain tile.

BACKGROUND

At present, the heating film types of electric heating porcelain tiles sold in the market are all used for laying on the ground for underfloor heating. As heating products with a large area laid in one position and in close contact with the human body, they are not equipped with safe and reliable lightning protection and grounding devices, they ignore the electrical safety of the products in long-term use. For example, Chinese patent with patent publication number CN108590098A (a high thermal conductivity and uniform heating electric heating porcelain tile and its production method) and Chinese patent with patent publication number CN108505715A (a high thermal conductivity and long service life electric heating porcelain tile). They are not equipped with lightning protection and grounding devices. As an electric heating facility with a long service life (more than 10 years), continuous working time, and in close contact with the human body, lightning protection, leakage prevention, and electrostatic prevention should be indispensable safety settings.

SUMMARY

The disclosure provides a lightning protective and heating porcelain tile, aiming to solve problems of not possessing abilities of lightning protection, leakage prevention, and electrostatic prevention of current heating-film-type electric heating porcelain tiles.

The disclosure is realized as follows, the lightning protective and heating porcelain tile, includes:
a porcelain tile layer;
a shell; where a side of the shell defines an opening, and the side of the shell defining the opening is attached to an inner wall of the porcelain tile layer;
a metal plate protective layer, located in the shell; where the metal plate protective layer is attached to the inner wall of the porcelain tile layer; and
an electric heating film heating layer, located in the shell; where the electric heating film heating layer is attached to an end surface of the metal plate protective layer facing away from the porcelain tile layer; and
where the electric heating film heating layer includes: an electric heating film, a first lightning protective module and a second lightning protective module; a hot wire (i.e., live wire) connected to the electric heating film and a neutral wire connected to the electric heating film are respectively electrically connected with the first lightning protective module and the second lightning protective module; the first lightning protective module and the second lightning protective module are individually connected with the metal plate protective layer through conductors (i.e., conducting wires); and the metal plate protective layer is connected with a ground wire through the conductors.

In an embodiment, the metal plate protective layer is flush with the opening.

In an embodiment, the porcelain tile layer includes a porcelain tile and a first thermal conductive coating. The first thermal conductive coating is coated on an inner wall of the porcelain tile and a side coated with the first thermal conductive coating of the porcelain tile is connected to the metal plate protective layer.

In an embodiment, the metal plate protective layer includes a metal plate and a second thermal conductive coating. The second thermal conductive coating is coated on a side of the metal plate facing away from the porcelain tile and a side coated with the second thermal conductive coating of the metal plate is connected with the electric heating film heating layer.

In an embodiment, the metal plate is a galvanized steel plate, a steel plate, a stainless steel plate, an aluminum plate, or an alloy plate.

In an embodiment, the lightning protective and heating porcelain tile further includes a thermal radiation reflecting layer located between the shell and the electric heating film, and the thermal radiation reflecting layer is in contact with a side facing away from the metal plate protective layer of the electric heating film.

In an embodiment, the electric heating film is a graphene electric heating film, a carbon crystal electric heating film, a metal wire electric heating film, or a carbon fiber electric heating film.

In an embodiment, a thickness of the metal plate is in a range of 0.2 mm to 2.0 mm, and a surface resistance of the metal plate is less than $2\Omega$.

In an embodiment, the electric heating film heating layer further includes a power input connector and a power output connector. The hot wire of the power input connector is connected to the first lightning protective module through conductors, and the neutral wire of the power input connector is connected to the second lightning protective module.

Compared with related art, the embodiments of the disclosure mainly have following beneficial effects.

1. The lightning protective and heating porcelain tile provided by the disclosure adopts a first lightning protective module and a second lightning protective module composed of varistors. When an overload occurs and an input voltage of the power input connector is too high, the first lightning protective module and the second lightning protective module direct a current to the metal plate protective layer. The metal plate protective layer is grounded, which can guide the current to the ground and release it, thereby improving the electrical safety of the lightning protective and heating porcelain tile.

2. The metal plate protective layer provided by the disclosure is located between the electric heating film heating layer and the porcelain tile layer, which can protect the electric heating film heating layer located on an inner side of the metal plate protective layer, avoiding damage from fragments of the porcelain tile layer to the electric heating film heating layer and a further overall failure of the lightning protective heating porcelain tile when outer walls of the porcelain tile layer is subjected to an impact force and causing the inner walls of the porcelain tile layer to crack.

DESCRIPTION OF REFERENCE NUMERALS

1: porcelain tile layer; 11: porcelain tile; 12: thermal conductive coating;
2: metal plate protective layer; 21: metal plate; 22: thermal conductive coating;
3: electric heating film heating layer; 31: electric heating film; 32: power input connector; 33: power output connector; 34: first lightning protective module; 35: second lightning protective module;
4: thermal radiation reflecting layer;
5: shell; 51: opening.

DETAILED DESCRIPTION OF EMBODIMENTS

Unless otherwise defined, all technical and scientific terms used in this article have the same meanings as those commonly understood by those skilled in the art. The terms used in the specification of the disclosure in this article are only for the purpose of describing specific embodiments and are not intended to limit the disclosure. The terms "including" and "having" and any variations thereof in the specification, claims and above brief description of drawings of the disclosure are intended to cover non-exclusive inclusion. The terms "first", "second", etc. in the specification and claims or above brief description of drawings of the disclosure are used to distinguish different objects, rather than to describe a specific order.

Referring to "embodiments" in this article means that specific characteristics, structures, or features described in conjunction with the embodiments may be included in at least one embodiment of the disclosure. A phrase appearing in various positions in the specification does not necessarily refer to a same embodiment, nor is it an independent embodiment that is mutually exclusive with other embodiments or an alternative embodiment. What those skilled in the art can explicitly and implicitly understand is that the embodiments described in this article can be combined with other embodiments.

Figure 1:
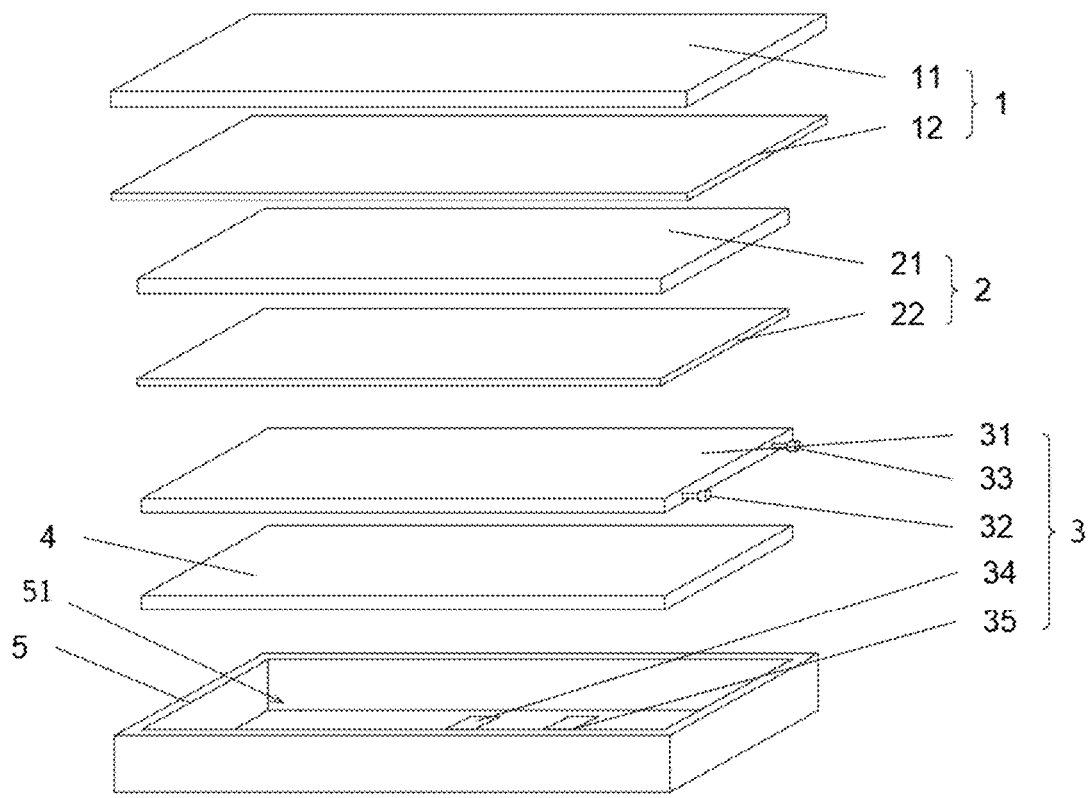
FIG. 1 illustrates a schematic structural diagram of a lightning protective and heating porcelain tile according to an embodiment of the disclosure.
Figure 2:
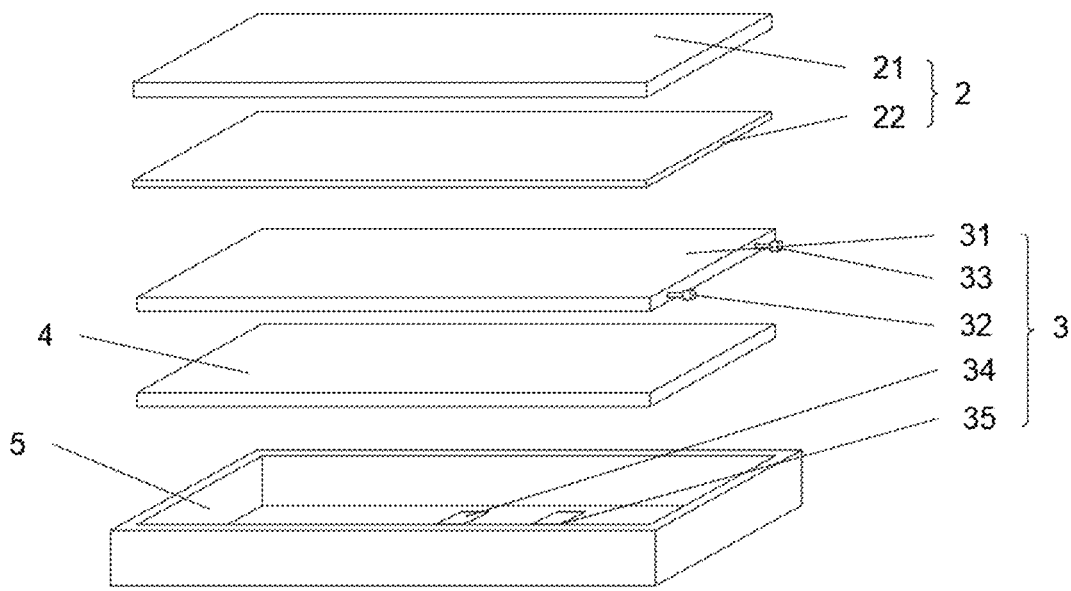
FIG. 2 illustrates a schematic structural diagram of a metal plate protective layer and an electric heating film heating layer of the lightning protective and heating porcelain tile according to the embodiment of the disclosure.
Figure 3:
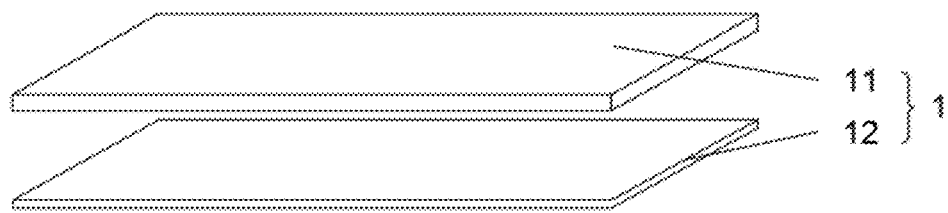
FIG. 3 illustrates a schematic structural diagram of a porcelain tile layer of the lightning protective and heating porcelain tile according to the embodiment of the disclosure.
Figure 4:
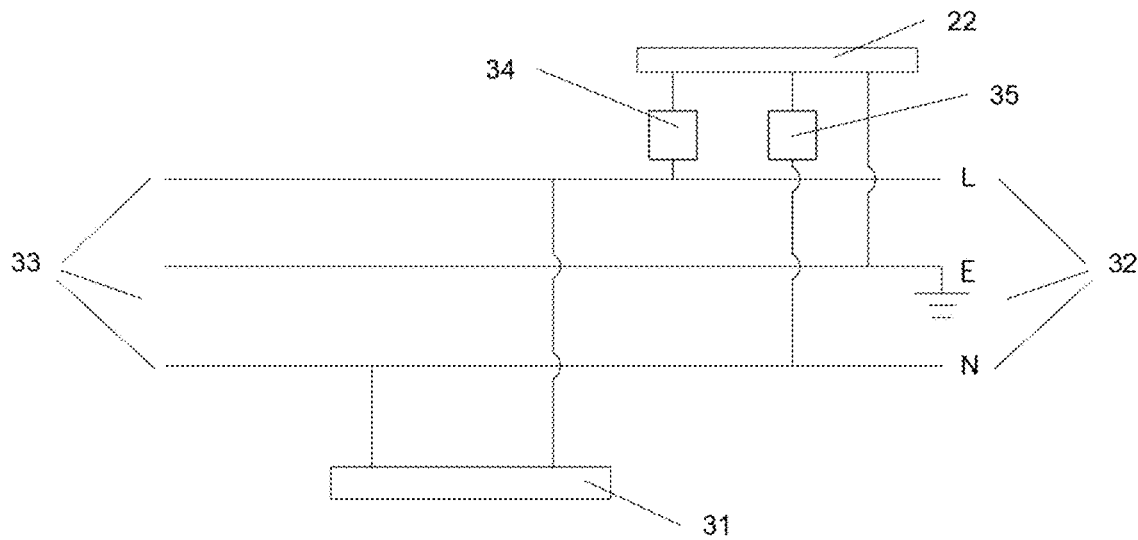
FIG. 4 illustrates a schematic diagram of a circuit connection of a hot wire, a neutral wire, a first lightning protective module, a second lightning protective module of the lightning protective and heating porcelain tile according to the embodiment of the disclosure.
Figure 5:
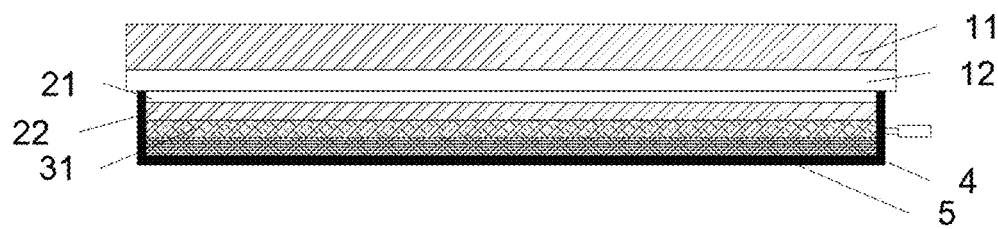
FIG. 5 illustrates a schematic diagram of an internal structure of the lightning protective and heating porcelain tile according to the embodiment of the disclosure.
Figure 6:
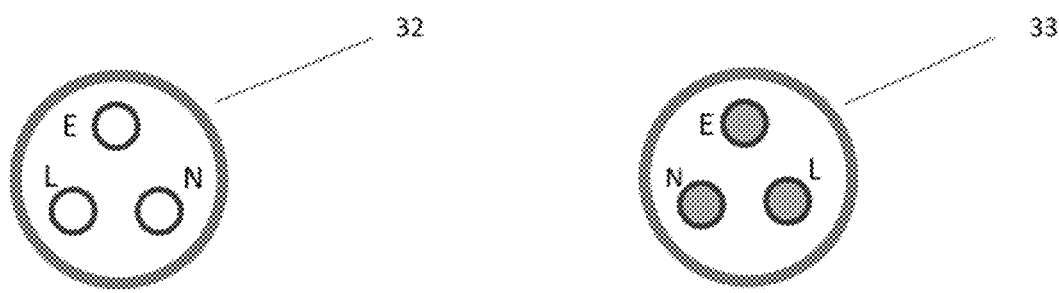
FIG. 6 illustrates a schematic structural diagram of a power input connector and a power output connector of the lightning protective and heating porcelain tile according to the embodiment of the disclosure.

An embodiment of the disclosure provides a lightning protective and heating porcelain tile. As illustrated in FIGS. 1, 2, 3, 4, 5 and 6, the lightning protective and heating porcelain tile, includes: a porcelain tile layer 1, a shell 5, a metal plate protective layer 2, and an electric heating film heating layer 3.

A side of the shell 5 defines an opening 51, and the side defining the opening 51 is attached to an inner wall of the porcelain tile layer 1.

The metal plate protective layer 2 and the electric heating film heating layer 3 are located in the shell 5. The metal plate protective layer 2 is flush with the opening 51, and is attached to the inner wall of the porcelain tile layer 1. The electric heating film heating layer 3 is attached to an end surface facing away from the porcelain tile layer 1 of the metal plate protective layer 2.

The electric heating film heating layer 3 includes: an electric heating film 31, a first lightning protective module 34 and a second lightning protective module 35. A hot wire connected to the electric heating film 31 and a neutral wire connected to the electric heating film 31 are respectively electrically connected with the first lightning protective module 34 and the second lightning protective module 35. The first lightning protective module 34 and the second lightning protective module 35 are individually connected with the metal plate protective layer 2 through conductors. The metal plate protective layer 2 is connected with a ground wire through a conductor.

In the embodiment, the electric heating film heating layer further includes a power input connector 32 and a power output connector 33 disposed on the electric heating film 31. The power input connector 32 is connected to the electric heating film 31 through a single-phase three-wire power line. The hot wire of the power input connector 32 is connected to the first lightning protective module 34 through a conductor, and the neutral wire of the power input connector 32 is connected to the second lightning protective module 35 through a conductor. The first lightning protective module 34 and the second lightning protective module 35 are individually connected with the metal plate protective layer 2 through the conductors. The metal plate protective layer 2 provides a connecting conductor and is connected with the ground wire of the power input connector 32 through the connecting conductor. The power output connector 33 is connected in series with a power input connector of another lightning protective and heating porcelain tile through a conductor, and a power output connector of the last lightning protective and heating porcelain tile is spirally connected with a sealed, waterproof, flame-retardant, insulated and temperature resistant terminator for sealing, ensuring safety of circuits.

The hot wire, the neutral wire and the ground wire of the power input connector 32 are respectively connected to a hot wire, a neutral wire and a ground wire of the power output connector 33 through conductors in the shell 5, multiple lightning protective and heating porcelain tiles are connected in series outside the shell 5 to form a single-phase three-wire transmission path. A hot wire and a neutral wire of the electric heating film 31 are connected correspondingly to a corresponding hot wire circuit (e.g., hot wire) and a corresponding neutral wire circuit (e.g., neutral wire) of the power input connector 32, which is equivalent to the hot wire of the electric heating film 31 is connected to a voltage through the single-phase three-wire transmission path and returns to form a circuit through the neutral wire of electric heating film 31. The circuit connection technology in the related art is adopted here and is not elaborated in detail.

The first lightning protective module 34 and the second lightning protective module 35 use varistors mainly or varistors and other auxiliary components to form lightning protective modules. When overload occurs and the input voltage of the power input connector 32 is too high, the first lightning protective module 34 and the second lightning protective module 35 direct a current to the metal plate protective layer 2, which is grounded. The metal plate protective layer 2 is connected to the ground wire connecting to the power input connector 32 through the conductor, which can guide the current to the ground and release it, thereby improving the electrical safety of the lightning protective and heating porcelain tile. By this, the lightning protective and electric heating porcelain tile possesses characteristics of lightning protection, leakage and electric shock prevention, anti-static, and high electrical safety.

In the embodiment, the metal plate protective layer 2 further has a function. As the metal plate protective layer 2 is located between the electric heating film heating layer 3 and the porcelain tile layer 1, the metal plate protective layer 2 can protect the electric heating film heating layer 3 located on an inner side of the metal plate protective layer 2. An outer wall of the porcelain tile layer 1 faces towards indoors, and the inner wall of the porcelain tile layer 1 faces towards the ground, the inner wall of the porcelain tile layer 1 is the side connected to the metal plate protective layer 2 of the porcelain tile layer 1. When the outer wall of the porcelain tile layer 1 is subjected to an impact force, causing the inner wall to a minor crack, damage from fragments of the porcelain tile layer 1 to the electric heating film heating layer 3 and overall failure of the lightning protective and heating porcelain tile can be avoided.

In an implementation of the embodiment, the porcelain tile layer 1 includes a porcelain tile 11 and a thermal conductive coating 12. The thermal conductive coating 12 is coated on an inner wall of the porcelain tile 11 and a side coated with the thermal conductive coating 12 of the porcelain tile 11 is connected to the metal plate protective layer 2.

The metal plate protective layer 2 includes a metal plate 21 and a thermal conductive coating 22. The thermal conductive coating 22 is coated on a side facing away from the porcelain tile 11 of the metal plate 21. The side coated with the thermal conductive coating 22 of the metal plate 21 is connected with the electric heating film heating layer 3.

In the embodiment, the thermal conductive coating 22 and the thermal conductive coating 12 adopt a material with insulation, waterproofing, good thermal conductivity, and strong adhesion.

The metal plate 21 is a galvanized steel plate, a steel plate, a stainless steel plate, an aluminum plate, or an alloy plate. A thickness of the metal plate 21 is in a range of 0.2 mm to 2.0 mm, and a surface resistance of the metal plate 21 is less than 2Ω. The thermal conductive coating 22 and the thermal conductive coating 12 improves a sound insulation performance and a thermal insulation performance of the lightning protective and heating porcelain tile, improving a thermal energy utilization efficiency.

In an implementation of the embodiment, the electric heating film 31 is a graphene electric heating film, a carbon crystal electric heating film, a metal wire electric heating film, or a carbon fiber electric heating film.

The lightning protective and heating porcelain tile further a thermal radiation reflecting layer 4 located between the shell 5 and the electric heating film 31. The thermal radiation reflecting layer 4 is disposed on a side facing away from the metal plate protective layer 2 of the electric heating film 31. The thermal radiation reflecting layer 4 reduces a heat dissipation from a side facing away from the porcelain tile layer 1 of the electric heating film 31, making the heat dissipation concentrated to the outer wall of the porcelain tile layer 1.

A method for preparing the lightning protective and heating porcelain tile includes following steps S1-S9.

S1, thermal conductive coatings (i.e., thermal conductive coating 12 and thermal conductive coating 22) for the porcelain tile 11 and the metal plate 21 are prepared in advance.

Specifically, the porcelain tile 11, the metal plate 21 and an insulation thermal conductive coating material are prepared. A bottom surface of the porcelain tile 11 (i.e., a surface tightly attached to the metal plate 21) and a bottom surface of the metal plate 21 (a surface tightly attached to the electric heating film 31) are faced upwards, and fully sprayed with an anhydrous cleaning agent. The cleaning agent sprayed on the bottom surface of the porcelain tile 11 and the bottom surface of the metal plate 21 stands for 1 to 2 minutes, and then the bottom surface of the porcelain tile 11 and the bottom surface of the metal plate 21 are blew by using a high-pressure air spray gun for air dry cleaning. After the air dry cleaning, the bottom surface of the porcelain tile 11 and the bottom surface of the metal plate 21 are baked at a temperature of 80° C. to 100° C. After the baking, the bottom surface of the porcelain tile 11 and the bottom surface of the metal plate 21 are placed at the room temperature, and then are coated with the thermal conductive coating material by using the high-pressure air spray gun. After the coating, the porcelain tile 11 and the metal plate 21 are pushed into a baking room with a temperature of 100° C. to 120° C. for baking. The porcelain tile 11 with the insulating and high thermal conductivity coating (i.e., thermal conductive coating) on the bottom and the metal plate 21 with the insulating and high thermal conductivity coating on the bottom are further obtained, and the preparation of the thermal conductive coating 22 on the bottom of the metal plate 21 and the thermal conductive coating 12 on the bottom of the porcelain tile 11 are completed.

S2, the metal plate protective layer 2, the electric heating film heating layer 3, the thermal radiation reflecting layer 4 and lightning protective modules are prepared.

Specifically, the electric heating film heating layer 3, the metal plate 21 with the thermal conductive coating 22 on the bottom obtained in the S1, the first lightning protective module 34, the second lightning protective module 35, and the thermal radiation reflecting layer 4 are prepared. The metal plate 21 is used as the substrate, and the thermal conductive coating 22 coated on the bottom of the metal plate 21 is placed facing upwards. The electric heating film 31 and the thermal radiation reflecting layer 4 are sequentially laid on the thermal conductive coating 22 in that order.

The first lightning protective module 34 and the second lightning protective module 35 are further placed at appropriate positions on a side facing away from the electric heating film 31 of the thermal radiation reflecting layer 4. The hot wire and the neutral wire are respectively connected to two lightning protective modules. The first lightning protective module 34 is connected to the hot wire of the power input connector 32 through a conductor, and the second lightning protective module 35 is connected to the neutral wire of the power input connector 32 through a conductor. A ground wire of the first lightning protective module 34 and a ground wire of the second lightning protective module 35 and an end of a ground wire of the power input connector 32 are welded to the metal plate 21, defining a connection point. The connection point, a power line connection point of the electric heating film 31 and connection points of the conductors of the lightning protective modules, the hot wire, and the neutral wire are all sealed with flame retardant, temperature resistant, waterproof insulation glues. And edges of each layer are further sealed with the flame retardant, temperature resistant, waterproof insulation glues, making the metal plate protective layer 2, the electric heating film heating layer 3, the thermal radiation reflecting layer 4, the first lightning protective module 34 and the second lightning protective module 35 form a component.

S3, the porcelain tile 11 and the component are combined.

Specifically, the porcelain tile 11 prepared in the S1 with the component prepared in the S2 are combined. The porcelain tile 11 and the thermal conductive coating 12 are placed in a bottom-to-up sequence. A side of the porcelain tile 11 coated with the thermal conductive coating 12 is faced upwards, the component prepared in the S2 is aligned and disposed on the thermal conductive coating 12. The metal plate protective layer 2 is closely attached to the thermal conductive coating 12 coated on the porcelain tile 11, and surrounding edges of the closely attached positions are sealed with flame retardant, temperature resistant, waterproof insulation glues, thus obtaining a functional component body.

S4, the functional component body and the flame-retardant waterproof insulation shell 5 are pressed.

Specifically, the functional component body prepared in the S3 is placed into a foam steel mold, with the outer wall of the porcelain tile 11 faced downwards. The power input connector 32 and the power output connector 33 are pulled outside the foam steel mold through wire grooves set on the foam steel mold. The flame-retardant, waterproof, temperature resistant and insulation materials are injected into the foam steel mold. The mold cover is closed. After foaming is completed, the functional component body is taken out to obtain a lightning protection, leakage proof, and electric heating porcelain tile with characteristics of flame-retardant, waterproof, and insulation.

It should be noted that for the sake of simplicity, the aforementioned embodiments are all expressed as a series of action combinations. However, those skilled in the art should be aware that this disclosure is not limited by an order of the described actions, as according to the disclosure, certain steps may be performed in other orders or be carried out simultaneously. Secondly, those skilled in the art should also be aware that the embodiments described in the specification are all preferred embodiments, and the actions and modules involved may not be necessary for the disclosure.

The above embodiments are only used to explain the technical solutions of the disclosure, and not to limit the protection scope of the disclosure. Apparently, the described embodiments are only some of the embodiments of the disclosure, not all of them. Based on these embodiments, all other embodiments obtained by those skilled in the art without creative labor fall within the scope of protection of the disclosure. Although detailed explanations have been provided for the disclosure with reference to the above embodiments, those skilled in the art can still combine, add, delete, or make other adjustments to the features in each embodiment of the disclosure on condition of not making creative labor to obtain different technical solutions that are essentially not detached from the concept of the disclosure. These technical solutions also fall within the scope of protection of the disclosure.

What is claimed is:

1. A lightning protective and heating porcelain tile, comprising:
    a porcelain tile layer (1);
    a shell (5); wherein a side of the shell (5) defines an opening (51), and the side of the shell (5) defining the opening (51) is attached to an inner wall of the porcelain tile layer (1);
    a metal plate protective layer (2), located in the shell (5); wherein the metal plate protective layer (2) is attached to the inner wall of the porcelain tile layer (1); and
    an electric heating film heating layer (3), located in the shell (5); wherein the electric heating film heating layer (3) is attached to an end surface of the metal plate protective layer (2) facing away from the porcelain tile layer (1); and
    wherein the electric heating film heating layer (3) comprises: an electric heating film (31), a first lightning protective module (34) and a second lightning protective module (35); a hot wire connected to the electric heating film (31) and a neutral wire connected to the electric heating film (31) are respectively electrically connected with the first lightning protective module (34) and the second lightning protective module (35); the first lightning protective module (34) and the second lightning protective module (35) are individually connected with the metal plate protective layer (2) through conductors; and the metal plate protective layer (2) is connected with a ground wire through a conductor.

2. The lightning protective and heating porcelain tile as claimed in claim 1, wherein the metal plate protective layer (2) is flush with the opening (51).

3. The lightning protective and heating porcelain tile as claimed in claim 2, wherein the porcelain tile layer (1) comprises a porcelain tile (11) and a first thermal conductive coating (12); the first thermal conductive coating (12) is coated on an inner wall of the porcelain tile (11) and a side coated with the first thermal conductive coating (12) of the porcelain tile (11) is connected with the metal plate protective layer (2).

4. The lightning protective and heating porcelain tile as claimed in claim 3, wherein the metal plate protective layer (2) comprises: a metal plate (21) and a second thermal conductive coating (22); the first thermal conductive coating (22) is coated on a side of the metal plate (21) facing away from the porcelain tile (11); a side coated with the second thermal conductive coating (22) of the metal plate (21) is connected with the electric heating film heating layer (3).

5. The lightning protective and heating porcelain tile as claimed in claim 4, wherein the metal plate (21) is a galvanized steel plate, a steel plate, a stainless steel plate, an aluminum plate, or an alloy plate.

6. The lightning protective and heating porcelain tile as claimed in claim 5, wherein the lightning protective and heating porcelain tile further comprises: a thermal radiation reflecting layer (4) located between the shell (5) and the electric heating film (31); and the thermal radiation reflecting layer (4) is in contact with a side facing away from the metal plate protective layer (2) of the electric heating film (31).

7. The lightning protective and heating porcelain tile as claimed in claim 6, wherein the electric heating film (31) is a graphene electric heating film, a carbon crystal electric heating film, a metal wire electric heating film, or a carbon fiber electric heating film.

8. The lightning protective and heating porcelain tile as claimed in claim 7, wherein a thickness of the metal plate (21) is in a range of 0.2 mm to 2.0 mm, and a surface resistance of the metal plate (21) is less than 2Ω.

9. The lightning protective and heating porcelain tile as claimed in claim 8, wherein the electric heating film heating layer (3) further comprises: a power input connector (32) and a power output connector (33) disposed on the electric heating film (31); the hot wire of the power input connector (32) is connected to the first lightning protective module (34) through conductors, and the neutral wire of the power input connector (32) is connected to the second lightning protective module (35).

* * * * *